Patented Apr. 27, 1948

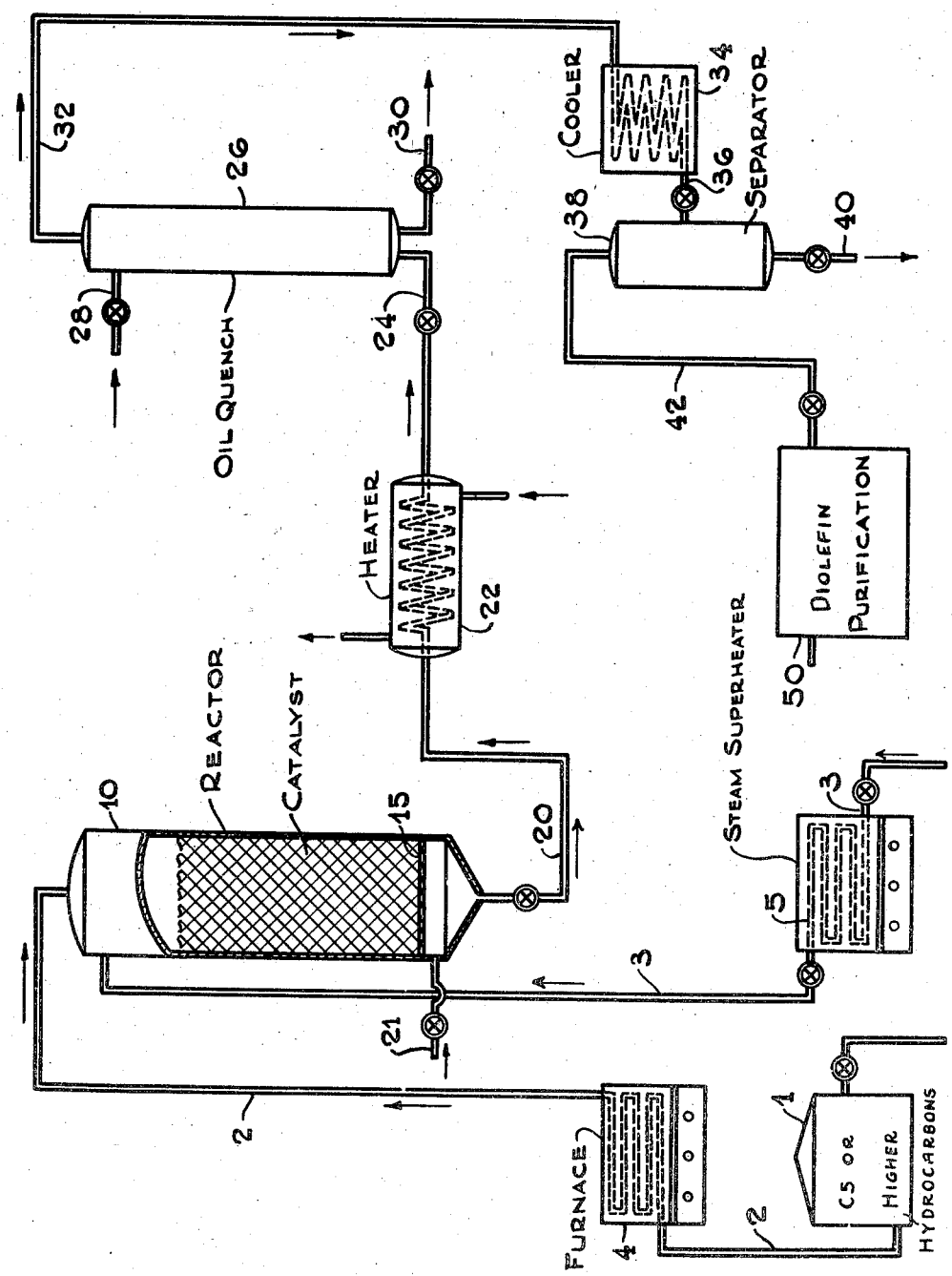

2,440,471

UNITED STATES PATENT OFFICE 2,440,471

PRODUCTION OF DIOLEFINS

Walter R. F. Guyer, Roselle, N. J., assignor to Standard Oil Development Company, a corporation of Delaware Application April 22, 1944, Serial No. 532,227

2 Claims. (Cl. 260—680)

The present invention relates to the production of diolefins, and more particularly it relates to the manufacture of butadiene by the dehydrogenation of amylenes accompanied by the splitting off of a carbon atom.

A great deal of research has been directed recently toward the production of butadiene, a material which is an important ingredient in the manufacture of synthetic rubber and rubber substitutes. In the normal refinery processes, such a catalytic cracking of hydrocarbon oils or steam cracking of hydrocarbon oils, minor amounts of butadiene are produced. The total amount of butadiene produced in the normal operation is far below that necessary to satisfy the present requirements for this very important material. There have been developed processes for producing butadiene from butane which is available in relatively large quantities as a result of petroleum refinery operations, as well as from natural gas sources, namely, from the so-called "field" butane sources. The butane is ordinarily dehydrogenated to form butenes under one set of conditions and using special catalyst and thereafter the butenes are dehydrogenated preferably using another type of catalyst to form the butadiene. Also, butenes are formed in substantial quantities in the normal refinery practice, particularly during catalytic cracking or steam cracking of gas oil, and these butenes may be dehydrogenated. An excellent catalyst for the dehydrogenation of butenes to form butadiene consists of iron oxide supported on magnesium oxide, promoted with potassium oxide and stabilized with copper oxide.

My present invention relates to producing butadiene from another source, namely, from the amylenes or pentenes which are available in substantial quantity as a result of refining hydrocarbon oils. In brief compass, my invention involves treating a mixture of amylenes at elevated temperature in the presence of a suitable catalyst whereby I produce butadiene in substantial yields as a butadiene-rich C₄ stream, in addition to the pentadienes.

The main object of my present invention is to provide means for producing butadiene in an expeditious and economical manner.

In the accompanying drawing, I have indicated a flow plan illustrating a preferred modification of my invention.

Referring in detail to the drawing, a mixture of amylenes is withdrawn from storage 1 through line 2, thence passed through a fired coil 4 and thence passed by an extension of line 2 into the top of a reactor 10. Meanwhile steam from some source is introduced into the system through line 3 and superheated in a superheater 5, and thereafter discharged into the reactor 10. A suitable catalyst is disposed in said reactor. This catalyst may be manganese dioxide, chromium oxide, iron oxide, cobalt oxide, and/or nickel oxide supported on a base such as magnesium oxide, zinc oxide, or barium oxide, with an added alkali metal promoter such as K₂O. Oxides such as CuO, Al₂O₃, ThO₂, etc., may be present as stabilizers. The catalyst itself is in the physical form of pills, pellets, granules, and the like, disposed on a screen or other foraminous member 15. A temperature of from 1100–1400° F. is maintained in the reaction zone during the reaction. This temperature is acquired by preheating the amylenes and the steam and mixing them in suitable proportions to obtain the desired temperature. The ratio of steam to amylene feed entering the reactor is from 5–40 volumes of steam per volume of amylene, and the total gas pressure within the reaction zone is of the order of 1 atmosphere. The partial pressure of the amylenes will be merely a fraction of an atmosphere. This condition is desirable because it favors the demethanation and dehydrogenation reactions and because the nascent butadiene or other diolefins formed tend to polymerize, and the reduced pressure counteracts this latter tendency.

The reaction products are withdrawn through line 20 and are passed through a waste heat boiler 22 where they are cooled. Preferably, however, before withdrawing them from the reaction zone they are quenched with water injected through line 21 into a point in the reactor below the bed of catalyst, or, in other words, they are quenched with water immediately as they issue from the bed of catalyst to prevent polymerization, degradation and other undesirable reactions causing losses in yields. The gases are cooled by the quenching water injected through line 21 to a temperature of, say, 900–1000° F. and are further cooled in the waste heat boiler 22 to a temperature of, say, 500° F. The products are withdrawn from waste heat boiler 22 through line 24 and usually quenched with oil in an oil quenching zone 26, the oil such as cold naphtha being injected into zone 26 through line 28 and withdrawn through line 30. In oil quenching zone 26 the product is cooled to about 220–400° F., namely above the condensation temperature of steam, because it is desirable to prevent co-condensation of steam and tarry material, since emulsification difficulties would ensue, the water tending to be polluted with tar and polymers, hence causing a disposal problem. Accordingly, the vapors withdrawn from quenching zone 26 through line 32 contain the bulk of the steam which was originally added or mixed with the reactant, and the steam is condensed in a coil 34, thereafter the water and product are withdrawn through line 36 and discharged into a water separator 38 from which the water may be withdrawn in relatively clean condition through line 40, while the product is withdrawn overhead from the separator 38 through line 42 and discharged into a butadiene purification system which I have indicated as 50. It will not be necessary to describe in detail the method of purifying butadiene separated from unchanged amylenes and other materials associated therewith. Suffice it to say it may be purified in known manner (by the use of selective solvents, etc.) and recovered in a commercially pure state.

Having generally described above an operation in which a preferred modification of my invention may be carried into effect, I wish to point out that I purposely omitted a number of conventional expedients that may be employed in order to aid or improve the process from an engineering standpoint. For instance, the skilled engineer will realize that pumps and other equipment will be necessary to cause the desired flow of materials through the system I have indicated, and, furthermore, various devices such as steam and amylene-mixing devices may be employed to effect good mixing.

Referring again to the catalyst, I propose to use, as stated, a catalyst consisting of a base, an active dehydrogenation agent, a promoter and a stabilizer. The catalyst is one which is not affected by contact with steam. Thus, for instance, a good catalyst is one which contains the following ingredients in parts by weight:

MgO _____ 78.5
$Fe_2O_3$ _____ 20
CuO _____ 5
$K_2O$ _____ 5

This catalyst has the advantage that it may be regenerated by steam. In other words, a preferred way to operate my process is to conduct the operation in two-hour cycles, the first hour being devoted to feeding a mixture of steam and amylenes to the reaction zone to form a desired butadiene and the next hour the feed of amylene is discontinued and the catalyst is merely treated with steam. It is necessary to regenerate the catalyst periodically because the productive phase of the operation does result in the deposition of tarry materials on the catalyst. To give specific examples illustrating my invention, I set forth below the conditions and results of experiments which have been made.

In these runs the $C_5$ olefins, pentene-2 and trimethylethylene, and a mixed pentenes feedstock (amylene) have been dehydrogenated over a catalyst of the composition set forth immediately above. The conditions and results are set forth in the table.

*Table*

Comparison of behavior of various $C_5$ olefins when they are passed over a dehydrogenation catalyst of the composition: 78.5 MgO-20 $Fe_2O_3$-5 CuO-5 $K_2O$ [1] in the presence of steam diluent.]

| Feedstock | Mixed Pentenes[2] | Trimethyl-ethylene | Pentene-2 | | |
|---|---|---|---|---|---|
| Feedrate, v/v/Hr [3] | 485 | 476 | 486 | 498 | 508 |
| Steam Dilution Ratio [4] | 5.4/1 | 7.1/1 | 6.9/1 | 7.6/1 | 13.7/1 |
| Temperature, °F | 1,210 | 1,200 | 1,150 | 1,200 | 1,200 |
| Conversion, Mol Per cent | 46.7 | 42.4 | 24.7 | 42.2 | 44.6 |
| Yield of Pentadiene,[5] Mol Per cent, on Feed | 18.0 | 27.7 | 7.6 | 11.3 | 10.8 |
| Yield of Butadiene, Mol Per cent, on Feed | 8.0 | 0.9 | 8.7 | 14.1 | 13.8 |
| Yield of Butenes, Mol Per cent, on Feed | 6.3 | 4.4 | 2.2 | 4.0 | 3.4 |
| Yield of Pentadiene, Mol Per cent, on reacted feed | 38.5 | 65.5 | 30.7 | 26.8 | 24.2 |
| Yield of Butadiene, Mol Per cent, on reacted feed | 17.1 | 2.1 | 35.2 | 33.4 | 31.0 |
| Diolefin Concentration in $C_5$ Cut, Mol Per cent | 25.2 | 32.5 | 9.2 | 16.2 | 16.4 |
| Tertiary Olefin Conc. in $C_5$ Cut, Mol Per cent | | 59.1 | 18.5 | 28.7 | 12.0 |
| Diolefin in $C_4$ Cut, Mol Per cent | 55.6 | 17.0 | 78.5 | 78.4 | .81 |
| Coke, Wt. Per cent as C, on Feed | 2.5 | 1.5 | 2.5 | 1.6 | 1.9 |
| $CO+CO_2$, Wt. Per cent as C, on Feed | 4.5 | 4.1 | 1.4 | 4.6 | 8.2 |

[1] Parts by weight.
[2] Roughly two parts pentene-2, one part trimethylethylene.
[3] Volumes of hydrocarbon vapor (calculated at standard conditions) per volume of catalyst per hour.
[4] Volumes of steam per volume of hydrocarbon.
[5] The $C_5$ diolefin was analyzed for by maleic anhydride reagent.

These data indicate that while trimethylethylene is dehydrogenated selectively to $C_5$ diolefin (largely isoprene), pentene-2 (the straight chain pentene) yields somewhat more butadiene than pentadiene (largely piperylene). The results for the mixed pentenes feedstock are intermediate to those for the pure compounds. The concentration of butadiene in the $C_4$ cut from the pentene-2 feedstock is very high, being of the order of 80 vol. percent. This high concentration facilitates the purification of the butadiene.

The catalyst which I may use is preferably one containing iron oxide, magnesium oxide, copper and potassium oxide. These components may be used within the following range of proportions:

Component:                               Per cent by weight
    MgO _____ 50–95
    $Fe_2O_3$ _____ 3–49
    $K_2O$, $K_2CO_3$, KOH _____ 0.5–10
    CuO (stabilizer) _____ 0.5–20

Numerous modifications of my invention may be made by those who are familiar with this art. For example, instead of using amylenes I may use hexenes, or hexenes admixed with pentenes, and the products produced will include not only butadiene but also other diolefins, such as pentadienes and hexadienes.

In the drawing I have shown a stationary bed of catalyst in reactor 10. It is to be understood that I may employ a "fluidized" catalyst, i. e. the steam and reactants may flow into the bottom of the reactor containing powdered catalyst under flow conditions such that the catalyst is maintained in the form of a dense phase suspension. In this type of operation the catalyst may be withdrawn periodically and regenerated in a separate vessel and returned to the reaction zone thus maintaining continuity of operation. Also a further modification of my invention involves using catalyst in the form of microspheres.

What is claimed is:

1. The method of selectively producing butadiene and pentadiene in controlled proportions from pentenes, which comprises charging a mixture of steam with a pentene feed having a controlled proportion of trimethylethylene and of a straight-chain pentene to a reaction zone in which the mixture is contacted with an active dehydrogenation catalyst selected from the class consisting of manganese oxide, chromium oxide, iron oxide, cobalt oxide and nickel oxide associated with a base from the class consisting of magnesium oxide, zinc oxide, and barium oxide, together with an alkaline metal compound having basic properties and a stabilizing oxide, maintaining the temperature in the reaction zone at essentially between 1100 and 1400° F., obtaining principally pentadiene from the trimethylethylene in the feed and butadiene from the straight-chain pentene in the feed, the diolefin product in preponderance being determined by the controlled proportion of the trimethylethylene and of straight-chain pentene in the feed, said pentenes being reacted at the same temperature in the reaction zone.

2. The method of selectively producing butadiene and pentadiene in controlled proportions from pentenes, which comprises charging a mixture of steam with a pentene feed having a controlled proportion of trimethylethyene and of pentene-2 to a reaction zone in which the mixture is contacted with an active dehydrogenation catalyst selected from the class consisting of manganese oxide, chromium oxide, iron oxide, cobalt oxide and nickel oxide associated with a base from the class consisting of magnesium oxide, zinc oxide, and barium oxide together with an alkaline metal compound having basic properties and a stabilizing oxide, maintaining the temperature in the reaction zone at 1150° F. to 1210° F. and obtaining principally pentadiene from the trimethylethylene in the feed and butadiene from the pentene-2 in the feed, the diolefin product in preponderance being determined by the controlled proportion of the trimethylethylene and of pentene-2 in the feed, said pentenes being reacted at the same temperature in the reaction zone.

WALTER R. F. GUYER.

REFERENCES CITED

The following references are of record in the file of this patent:

UNITED STATES PATENTS

| Number | Name | Date |
|---|---|---|
| 1,986,241 | Wulff et al. | Jan. 1, 1935 |
| 2,178,584 | Grosse | Nov. 7, 1939 |
| 2,178,602 | Morrell et al. | Nov. 7, 1939 |
| 2,307,240 | Ruthruff | Jan. 5, 1943 |
| 2,367,623 | Schulze et al. | Jan. 16, 1945 |
| 2,376,191 | Roetheli et al. | May 15, 1945 |
| 2,391,158 | Hepp | Dec. 8, 1945 |
| 2,395,875 | Kearby | Mar. 5, 1946 |
| 2,396,416 | Frey | Mar. 12, 1946 |

OTHER REFERENCES

Michailov et al., Comptes Rendus Doklady de l'Acad. des Sci. de l'URSS, 1936, vol. III (XII) No. 9 (104).